(12) United States Patent
Song et al.

(10) Patent No.: US 10,863,091 B2
(45) Date of Patent: Dec. 8, 2020

(54) METHOD AND APPARATUS FOR CORRECTING INFLUENCE OF MOVEMENTS OF ELECTRONIC DEVICE ON IMAGE

(71) Applicant: SAMSUNG ELECTRONICS CO., LTD., Suwon-si (KR)

(72) Inventors: Won Seok Song, Seoul (KR); Nak Hoon Kim, Suwon-si (KR); Byung Ho Ahn, Yongin-si (KR); Jae Mu Yun, Hwaseong-si (KR); Hak Jae Jeon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/470,692

(22) PCT Filed: Dec. 26, 2017

(86) PCT No.: PCT/KR2017/015498
§ 371 (c)(1),
(2) Date: Jun. 18, 2019

(87) PCT Pub. No.: WO2018/124706
PCT Pub. Date: Jul. 5, 2018

(65) Prior Publication Data
US 2020/0221031 A1  Jul. 9, 2020

(30) Foreign Application Priority Data
Dec. 30, 2016 (KR) .................. 10-2016-0183475

(51) Int. Cl.
*H04N 5/228* (2006.01)
*H04N 5/232* (2006.01)

(52) U.S. Cl.
CPC ..... *H04N 5/23267* (2013.01); *H04N 5/23254* (2013.01); *H04N 5/23258* (2013.01); *H04N 5/23287* (2013.01)

(58) Field of Classification Search
CPC ........... H04N 5/23267; H04N 5/23254; H04N 5/23258; H04N 5/23287
(Continued)

(56) References Cited

U.S. PATENT DOCUMENTS 8,098,286 B2  1/2012  Nakakuki et al.
9,626,743 B2  4/2017  Shibata
(Continued)

FOREIGN PATENT DOCUMENTS

JP  2013-135443  7/2013
JP  2013135443 A * 7/2013
(Continued)

OTHER PUBLICATIONS

International Search Report for PCT/KR2017/015498, dated Apr. 2, 2018, 5 pages.
(Continued)

*Primary Examiner* — Usman A Khan
(74) *Attorney, Agent, or Firm* — Nixon & Vanderhye, P.C.

(57) ABSTRACT

An example electronic device includes a camera, a sensor obtaining first motion information about motion of the electronic device, and a processor electrically connected to the camera and the sensor. The processor is configured to receive a plurality of image frames from the camera, to generate second motion information by applying a filter for a specified frequency band to the first motion information, to generate one or more image frames, in each of which at least partial motion of the motion is compensated based on the second motion information, from the at least part of image (Continued)

frames, and to display the one or more image frames through a display operatively connected to the electronic device. The receiving includes obtaining the first motion information about at least part of image frames among the plurality of image frames.

11 Claims, 10 Drawing Sheets

(58) Field of Classification Search
USPC .................................................. 348/208.6
See application file for complete search history.

(56) References Cited

U.S. PATENT DOCUMENTS

| 9,838,603 B2 | 12/2017 | Lee et al. |
| 2009/0160952 A1 | 6/2009 | Nakakuki et al. |
| 2016/0234440 A1 | 8/2016 | Lee et al. |

FOREIGN PATENT DOCUMENTS

| JP | 2016-024235 | 2/2016 |
| KR | 10-2009-0067060 | 6/2009 |
| KR | 10-2011-0093460 | 8/2011 |
| KR | 10-2016-0098853 | 8/2016 |

OTHER PUBLICATIONS

Written Opinion of the ISA for PCT/KR2017/015498, dated Apr. 2, 2018, 6 pages.

* cited by examiner

METHOD AND APPARATUS FOR CORRECTING INFLUENCE OF MOVEMENTS OF ELECTRONIC DEVICE ON IMAGE

This application is the U.S. national phase of International Application No. PCT/KR2017/015498 filed 26 Dec. 2017, which designated the U.S. and claims priority to KR Patent Application No. 10-2016-0183475 filed 30 Dec. 2016, the entire contents of each of which are hereby incorporated by reference.

TECHNICAL FIELD

Embodiments disclosed in the disclosure relate to a technology for compensating for the shaking effect of an electronic device in an image.

DESCRIPTION OF RELATED ART

A camera compensates for the motion caused by the shaking of a photographer's hand by an optical image stabilization (OIS) method or a digital image stabilization (DIS) method.

OIS may compensate for motion in the physical manner by moving the lens or image sensor in response to the motion of the camera; DIS may compensate for the obtained image based on the motion information or the like, which is obtained from a gyro sensor.

Nowadays, cameras may use both OIS and DIS functions to obtain improved images. When a camera uses both OIS advantageous for the motion compensation of a high frequency and DIS advantageous for the motion compensation of a low frequency, because information of the high-frequency motion compensated by OIS is not reflected to the compensation of DIS, the high-frequency motion may be overcompensated.

When an electronic device obtains the motion information of OIS to use the motion information of OIS for the DIS compensation, the image may be prevented from being overcompensated, but it is not easy to obtain the motion information of OIS.

SUMMARY

To provide an electronic device for solving the above-described problem and problems brought up in this specification, an electronic device that compensates for the image, which has been compensated using OIS without the motion information of OIS, by using DIS may be provided.

According to an embodiment disclosed in the disclosure, an electronic device may include a camera, a sensor obtaining first motion information about motion of the electronic device, and a processor electrically connected to the camera and the sensor. The processor may be configured to receive a plurality of image frames from the camera, to generate second motion information by applying a filter for a specified frequency band to the first motion information, to generate one or more image frames, in each of which at least partial motion of the motion is compensated based on the second motion information, from the at least part of image frames, and to display the one or more image frames through a display operatively connected to the electronic device. The receiving may include obtaining the first motion information about at least part of image frames among the plurality of image frames.

Furthermore, according to an embodiment disclosed in the disclosure, a recording medium storing computer-readable instructions may, when executed by a processor of an electronic device, cause the electronic device to perform receiving a plurality of image frames, wherein the receiving includes obtaining the first motion information associated with motion of the electronic device for at least part of image frames among the plurality of image frames, generating second motion information by applying a filter for a specified frequency band to the first motion information, generating one or more image frames, in each of which at least partial motion of the motion is compensated based on the second motion information, from the at least part of image frames, and displaying the one or more image frames through a display operatively connected to the electronic device.

Furthermore, according to an embodiment disclosed in the disclosure, an electronic device may include a camera including an optical image stabilization (OIS) function and obtaining a plurality of image frames compensated based on the OIS function, a display, a motion sensor obtaining motion information of the electronic device while the plurality of image frames are obtained, and a processor electrically connected to the camera, the display, and the sensor. The processor may be configured to generate a first motion vector based on the obtained motion information, to generate a second motion vector by applying first LPF to the first motion vector, to generate at least one compensated image frame from the plurality of image frames based on the second motion vector, and to display the generated at least one compensated image frame via the display.

According to various embodiments of the disclosure, it is possible to obtain an image improved by compensating for the image, which has been compensated using OIS without information about OIS motion, using DIS.

Besides, a variety of effects directly or indirectly understood through this disclosure may be provided.

DETAILED DESCRIPTION OF EXAMPLE EMBODIMENTS

Figure 1:
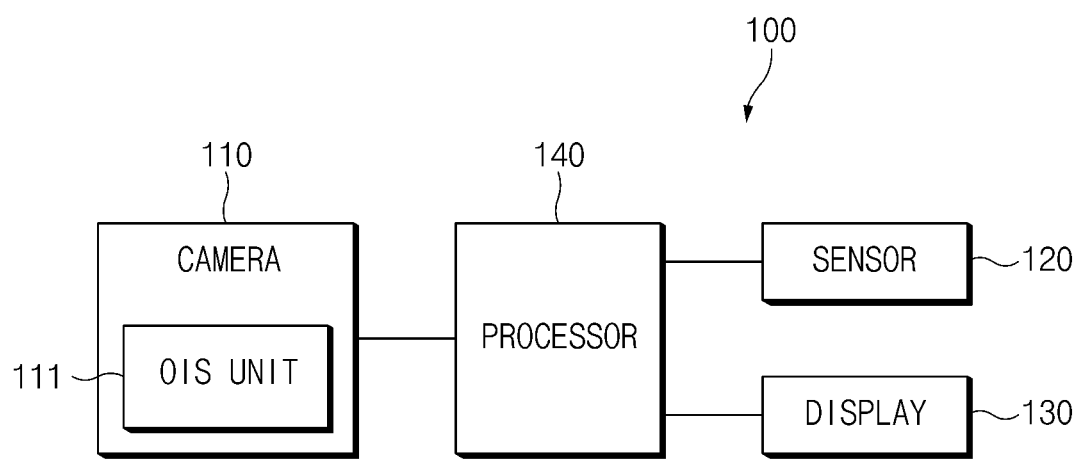
FIG. 1 is a block diagram of an electronic device, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a block diagram of an electronic device 100, according to an embodiment.

Referring to FIG. 1, the electronic device 100 (e.g., an electronic device 801 or 901) may include a camera 110, a sensor 120, a display 130, and a processor 140. In various embodiments, the electronic device 100 may omit a part of the above-mentioned components or may further include other components. For example, a component such as a battery or an input/output interface may be further included in the electronic device 100.

The camera 110 (e.g., a camera module 291) may obtain a plurality of image frames. In an embodiment, the camera 110 may include an OIS unit 111. The OIS unit 111 may compensate for shaking by moving at least one of a lens and an image sensor of the camera 110 in response to the shaking of the camera 110. Because the OIS unit 111 physically compensates for the shaking, the OIS unit 111 may effectively compensate for the shaking of a high frequency.

The sensor 120 (e.g., a sensor module 940) may obtain the motion information of the electronic device 100. While the camera 110 obtains a plurality of image frames, the sensor 120 may obtain motion information. The sensor 120 may be a motion sensor and may include at least one of a gyro sensor (e.g., a gyro sensor 940B or an acceleration sensor 940E) and an inertial sensor. In an embodiment, the sensor 120 may be mounted in the camera 110.

The display 130 (e.g., a display 860 or 960) may display the plurality of image frames under the control of the processor 140. In an embodiment, the display 130 may not be included in the electronic device 100 and may be an external display operatively connected to the electronic device 100.

The processor 140 (e.g., a processor 820 or 910) may be electrically connected to the camera 110 and the sensor 120 and may control overall operations of the electronic device 100. For example, the processor 140 may correspond to the application processor (AP) of the electronic device 100. For another example, the processor 140 may correspond to a central processing unit (CPU) or a processing core, which is implemented with a System on Chip (SoC) of the electronic device 100. Generally, the processor 140 may correspond to a processing circuit that controls other components electrically connected to the processor 140 in the electronic device 100 and performs calculation.

Hereinafter, a method in which the electronic device 100 generates and displays the image frame compensated from a plurality of image frames will be described with reference to FIGS. 2 to 7B.

Figure 2:
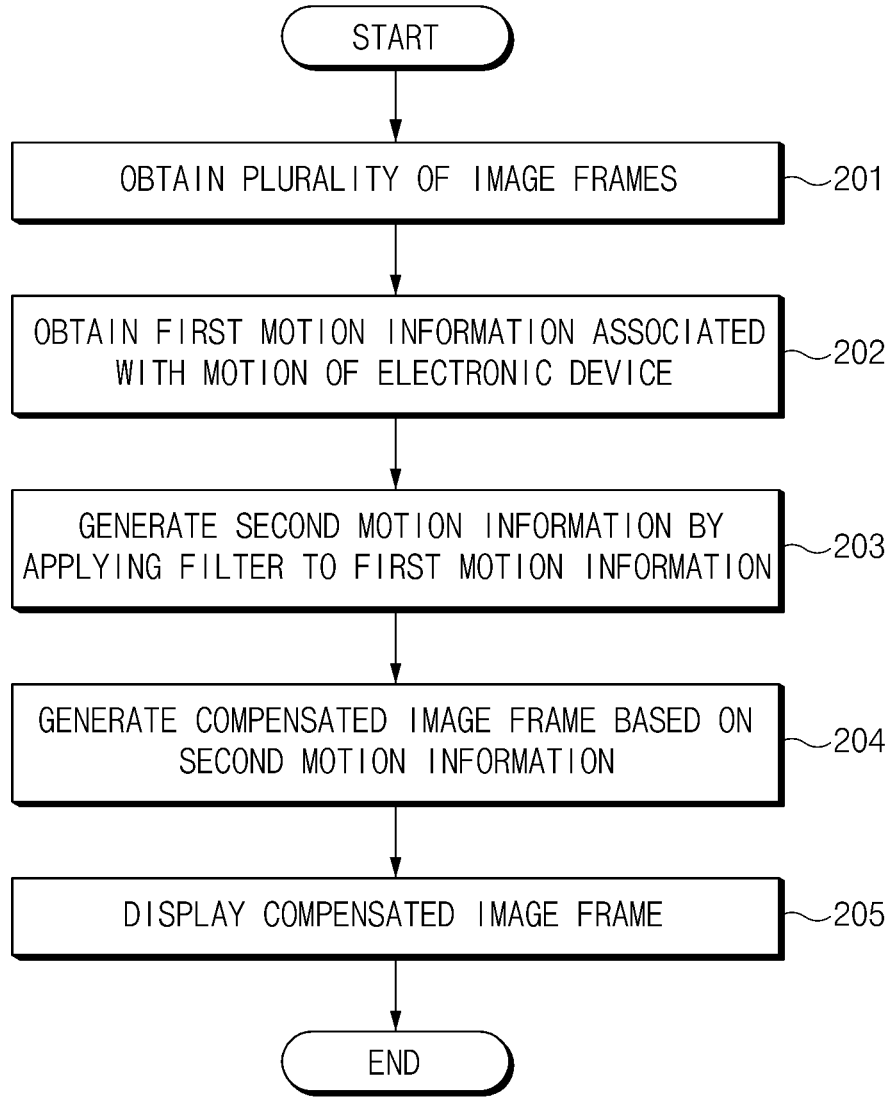
FIG. 2 is a flowchart illustrating a method of displaying the image frame in which motion is compensated, according to an embodiment.

FIG. 2 is a flowchart illustrating a method of displaying the image frame in which motion is compensated, according to an embodiment.

Referring to FIG. 2, in operation 201, the processor 140 may obtain a plurality of image frames using, for example, the camera 110. In an embodiment, the processor 140 may obtain the image frames in which the motion is compensated optically, using the OIS unit 111 of the camera 110. For example, when the electronic device 100 moves to the right, the processor 140 may move the image sensor of the camera 110 to the left, which is the direction opposite to the motion direction of the electronic device 100, using the OIS unit 111.

In operation 202, the processor 140 may obtain first motion information about at least part of image frames among the plurality of image frames of the electronic device 100, using, for example, the sensor 120. In an embodiment, while obtaining a plurality of image frames, the processor 140 may obtain the motion information (e.g., gyro data) of the electronic device 100, using the sensor 120, and the processor 140 may obtain the first motion information, based on the obtained motion information. The first motion information may be a motion vector corresponding to each of the plurality of image frames. Furthermore, pieces of motion information to be described below may be motion vectors.

In operation 203, the processor 140 may generate second motion information by applying a filter for a specified frequency band. In an embodiment, the filter for the specified frequency band may be a low pass filter (LPF). The processor 140 may generate the second motion information by applying a first LPF to the first motion information.

In an embodiment, the plurality of image frames obtained using the camera 110 by the processor 140 may be image frames in each of which the motion of a high frequency is compensated optically. The first motion information obtained by the processor 140 using the sensor 120 may include not only motion information of a low frequency but also motion information of a high frequency. When the processor 140 generates the image frame compensated from the plurality of image frames, based on the first motion information, the motion of the high frequency for an image frame may be overcompensated. Accordingly, the processor 140 may generate the second motion information by applying LPF to the first motion information.

Figure 3A:
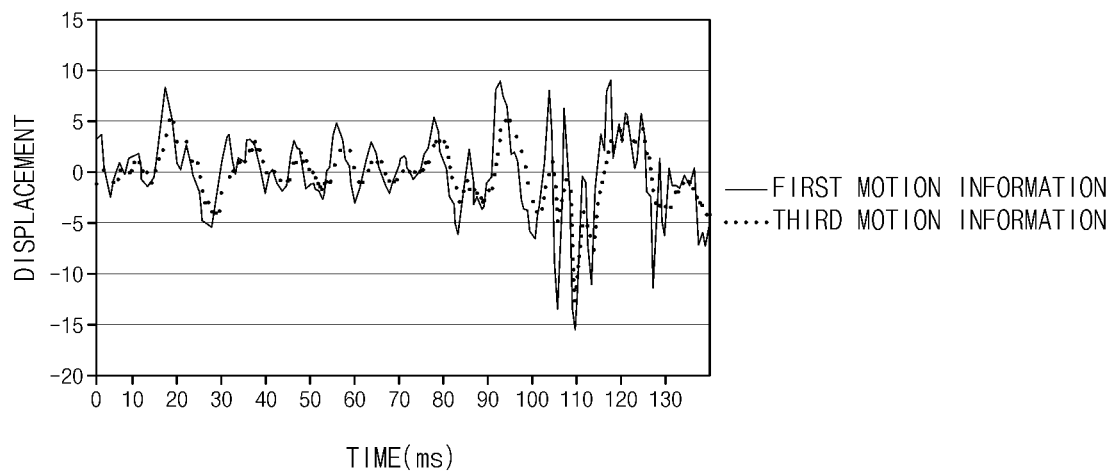
FIG. 3A is a graph illustrating first motion information and third motion information through displacement with time, according to an embodiment.
Figure 3B:
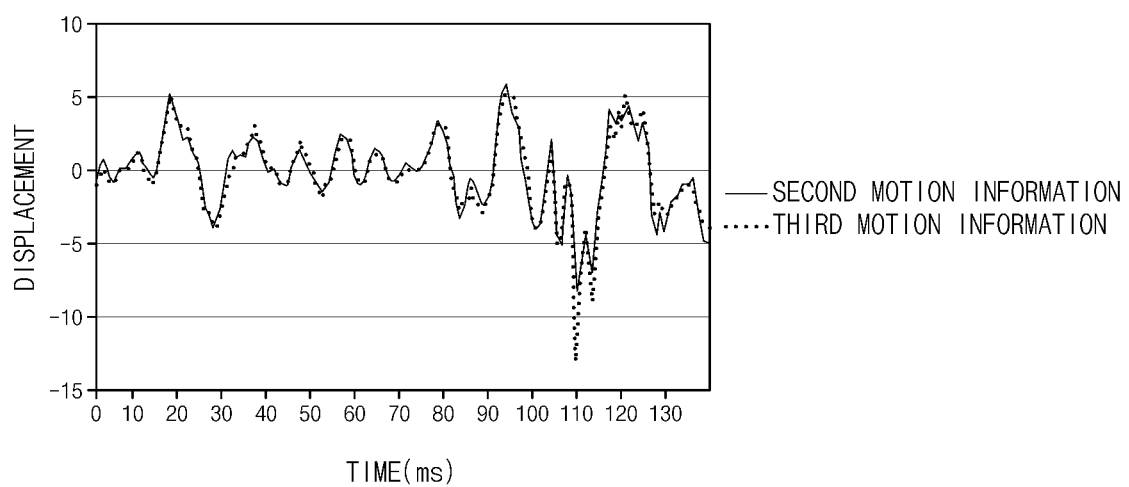
FIG. 3B is a graph illustrating second motion information and third motion information through displacement with time, according to an embodiment.

FIG. 3A is a graph illustrating first motion information and third motion information through displacement with time, according to an embodiment. FIG. 3B is a graph illustrating second motion information and third motion information through displacement with time, according to an embodiment. The third motion information may be motion information generated based on the motion of at least one object included in a plurality of image frames. The plurality of image frames may be the image frame in which the motion is compensated optically.

In an embodiment, the processor 140 may generate new second motion information including at least part of the first motion information and at least part of second motion information, based on a first weight corresponding to the first motion and a second weight corresponding to the second motion information. For example, the processor 140 may use an infinite impulse response (IIR) filter as LPF. In particular, a plurality of image frames may include a first image frame and a second image frame that is the previous image frame of the first image frame. The processor 140 may generate the second motion information corresponding to the first image frame, by synthesizing the first motion information, which corresponds to the first image frame and to which a first weight is applied, and the second motion information, which corresponds to the second image frame and to which a second weight is applied.

The sum of the first weight and the second weight may be '1'. As the value of the second weight increases, the pass band of an LPF filter implemented with an IIR filter may be narrowed.

LPF implemented as the IIR filter may be expressed as following Equation 1.

$$\text{GyroMV}_{LPF}(n) = (1 - \text{GyroLPFWeight}) \times \text{GyroMV}(n) + \text{GyroLPFWeight} \times \text{GyroMV}_{LPF}(n-1) \quad \text{[Equation 1]}$$

(In Equation 1, GyroMV is the first motion information; $\text{GyroMV}_{LPF}$ is the second motion information; (1−GyroLPFWeight) is the first weight; GyroLPFWeight is the second weight; the 'n' is the image frame number.)

The first weight and the second weight may be determined based on the maximum compensation value of the OIS unit 111. That is, as the maximum compensation value of the OIS unit 111 increases, because the extent to which the plurality of image frames are compensated is high, the value of the second weight may be determined to be great.

Referring to FIG. 3A, the first motion information based on motion information obtained by a processor using the sensor 120 may not coincide with the third motion information that is motion information based on the image frame obtained by the camera 110, in most sections. This is the reason that the first motion information is generated based on the uncompensated motion information of the electronic device 100 and the third motion information is generated based on an image frame in which the motion is compensated optically.

Referring to FIGS. 3A and 3B, the similarity between the second motion information and the third motion information is higher than the similarity between the first motion information and the third motion information. This is the reason that the second motion information is obtained by applying LPF to the first motion information and LPF removes the motion of a high-frequency domain similarly to OIS.

In operation 204, the processor 140 may generate one or more image frames in each of which at least part of motions is compensated among motions based on the second motion information, from at least part of image frames. The processor 140 may generate the compensated image frames by performing DIS based on the second motion information. In an embodiment, the processor 140 may generate a single still image from a plurality of image frames by performing DIS. However, in another embodiment, the processor 140 may generate two or more images that are successive, by performing DIS.

In operation 205, the processor 140 may display the generated at least one compensated image frame, via the display 130 operatively connected to the electronic device 100. In an embodiment, the display 130 may be the display 130 included in the electronic device 100. In another embodiment, the display 130 may correspond to an external display device operatively connected to the electronic device 100.

Returning to FIG. 3B, compared to another time domain, a displacement difference between the second motion information and the third motion information is very great at approximately 110 ms. This is an error caused by the physical limitation of the OIS unit 111. Hereinafter, a method of generating an image frame compensated further based at least on image-based motion information will be described to compensate for the error.

Figure 4:
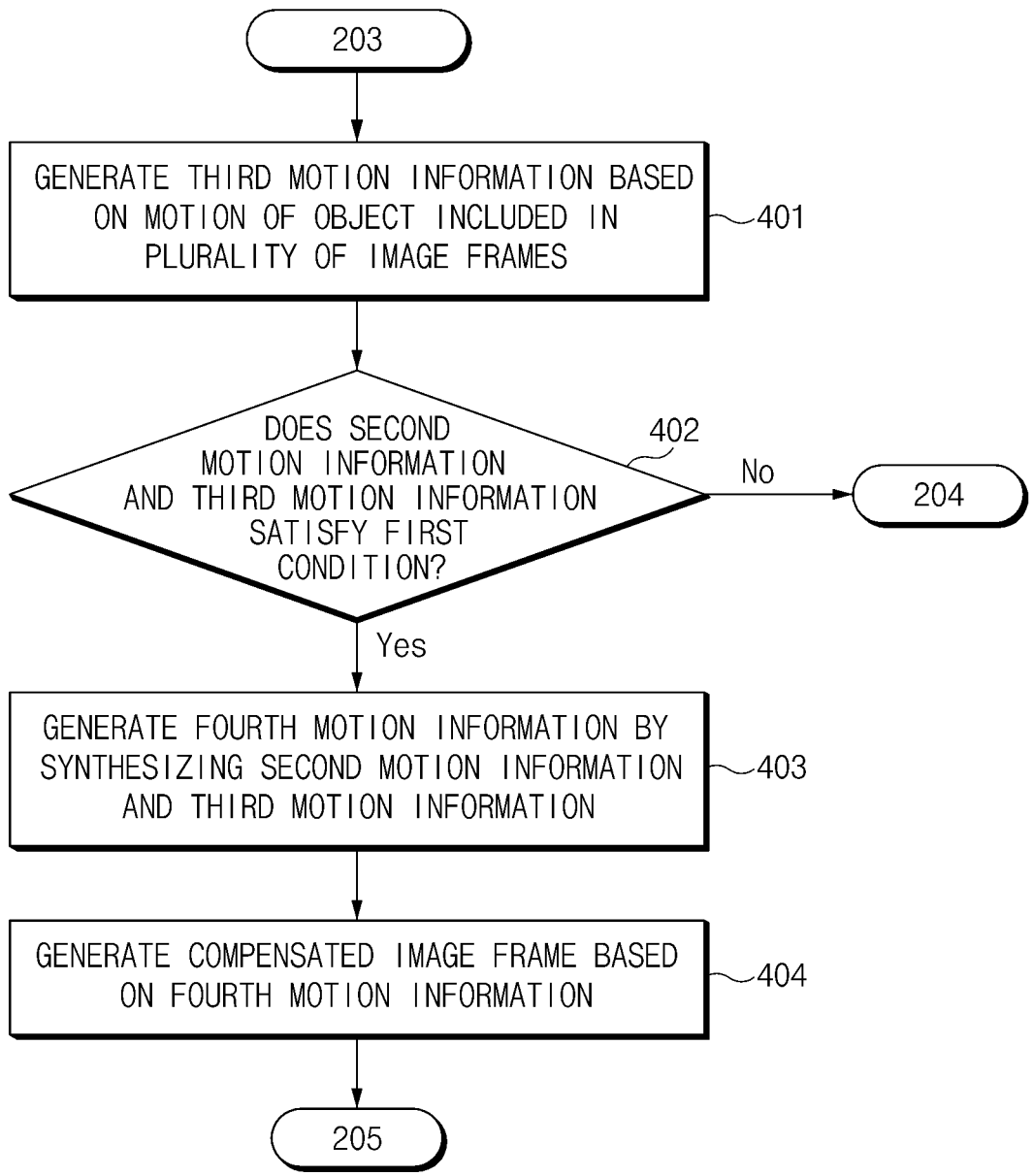
FIG. 4 is a flowchart illustrating a method of generating an image frame compensated further based on image-based motion information, according to an embodiment.

FIG. 4 is a flowchart illustrating a method of generating an image frame compensated further based on image-based motion information, according to an embodiment.

Referring to FIG. 4, in operation 401, the processor 140 may generate third motion information based on the motion of at least one object included in a plurality of image frames. Operation 401 may be performed subsequent to operation 203. The processor 140 may generate the third motion information, based on the image frame in which the motion is compensated optically. In an embodiment, the processor 140 may generate the third motion information based on the feature such as edges or the like which is capable of easily detecting in the plurality of image frames.

When the second motion information and the third motion information do not satisfy a first condition in operation 402, the processor 140 may perform operation 204 of generating the image frame compensated based on the second motion information.

In an embodiment, the first condition may be defined as an event that a difference between the motion included in the second motion information and the motion included in the third motion information exceeds a first threshold value.

When the second motion information and the third motion information satisfy a first condition in operation 402, the processor 140 may perform operation 403 of generating the fourth motion information, by synthesizing the second motion information and the third motion information.

In an embodiment, the processor 140 may generate the fourth motion information by synthesizing the second motion information, to which a third weight is applied, and the third motion information, to which a fourth weight is applied. The sum of the third weight and the fourth weight may be '1'. As the value of the fourth weight increases, the fourth motion information may include more image-based motion information.

A method of generating the fourth motion information may be expressed as following Equation 2.

$$MV_{final}(n) = Weight \times GyroMV_{LPF}(n) + (1-Weight) \times ImageMV(n) \quad \text{[Equation 2]}$$

(In Equation 2, $GyroMV_{LPF}$ is the second motion information; ImageMV is the third motion information; $MV_{final}$ is the fourth motion information; Weight is the third weight; (1−Weight) is the fourth weight; the 'n' is the image frame number.

Figure 5A:
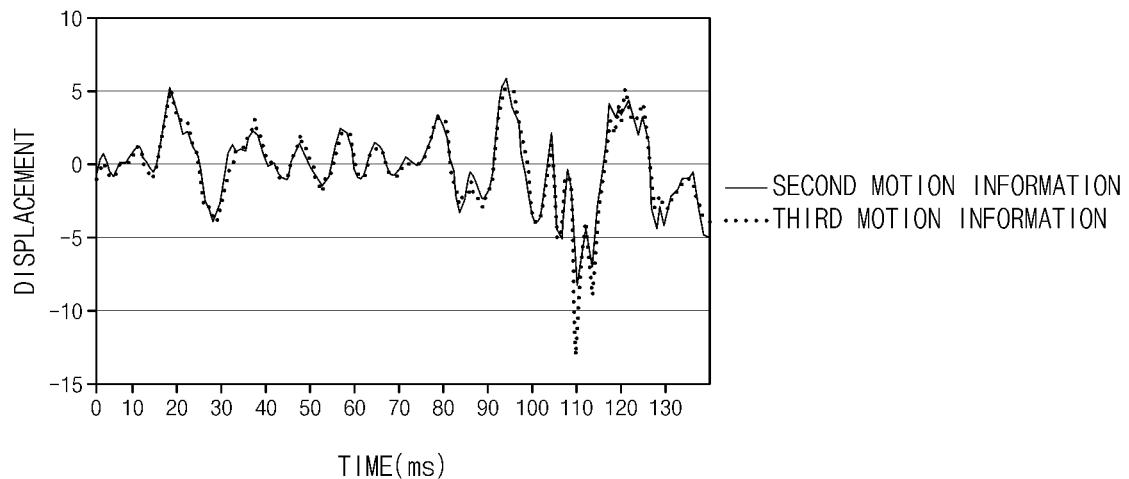
FIG. 5A is a graph illustrating second motion information and third motion information through displacement with time, according to an embodiment.
Figure 5B:
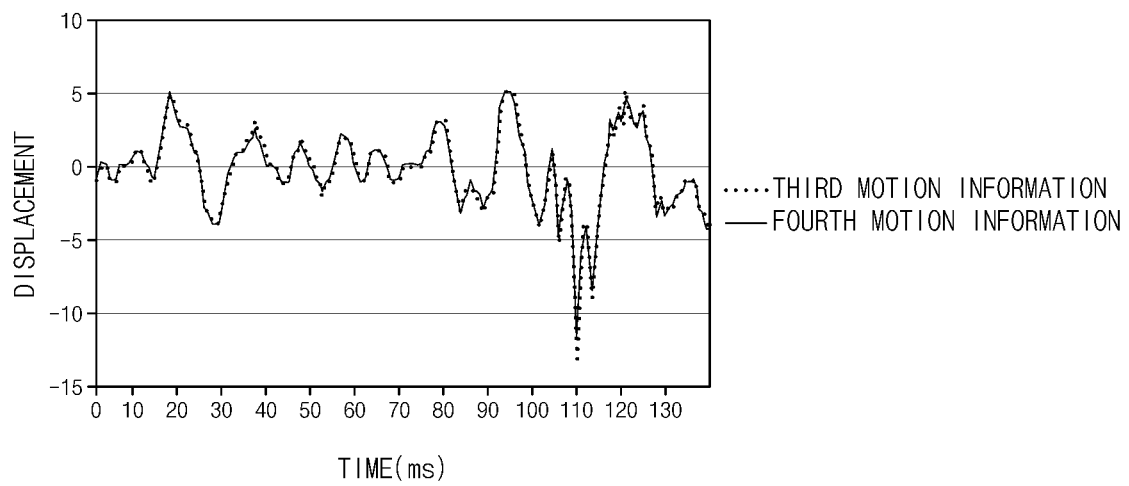
FIG. 5B is a graph illustrating third motion information and fourth motion information through displacement with time, according to an embodiment.

FIG. 5A is a graph illustrating second motion information and third motion information through displacement with time, according to an embodiment. FIG. 5B is a graph illustrating third motion information and fourth motion information through displacement with time, according to an embodiment.

In an embodiment, the first threshold value of the first condition may be '3'. Referring to FIG. 5A, because the displacement difference between the second motion information and the third motion information excesses '3' at approximately 110 ms, a first condition is satisfied. When the first condition is satisfied, the processor 140 may generate the fourth motion information by synthesizing the second motion information and the third motion information.

Referring to FIGS. 5A and 5B, unlike the second motion information indicating the great difference from the motion of the third motion information at approximately 110 ms, the fourth motion information has the difference of a first threshold value or less from third motion information, in the whole time domain.

In operation 404, the processor 140 may generate one or more image frames in each of which at least part of motions is compensated among motions, based on the fourth motion information generated from at least part of image frames. Operation 404 may be an operation corresponding to operation 204 described above and may generate the image frame compensated based on the fourth motion information.

The processor 140 may perform operation 205 of displaying the generated at least one compensated image frame, via the display 130 operatively connected to the electronic device 100.

In the meantime, because the fourth motion information includes image-based motion information, an error may occur in image compensation when an error is present in the image-based motion information.

For example, when an object is moved in an image frame in a state where the electronic device 100 is stopped, the third motion information may occur. The motion of the subject in successive frames may be also generated by the motion of the subject itself, in addition to the motion of the camera and the shaking of a user's hand. As such, the fourth motion information may include an error value different from the actual motion of the electronic device 100. In other words, according to an embodiment, the compensation in consideration of the motion of a subject may be performed in addition to OIS/DIS compensation in consideration of the motion of a camera.

Hereinafter, a method of generating an image frame compensated based on virtual image-based motion information will be described to compensate for the error generated in the image-based motion information.

Figure 6:
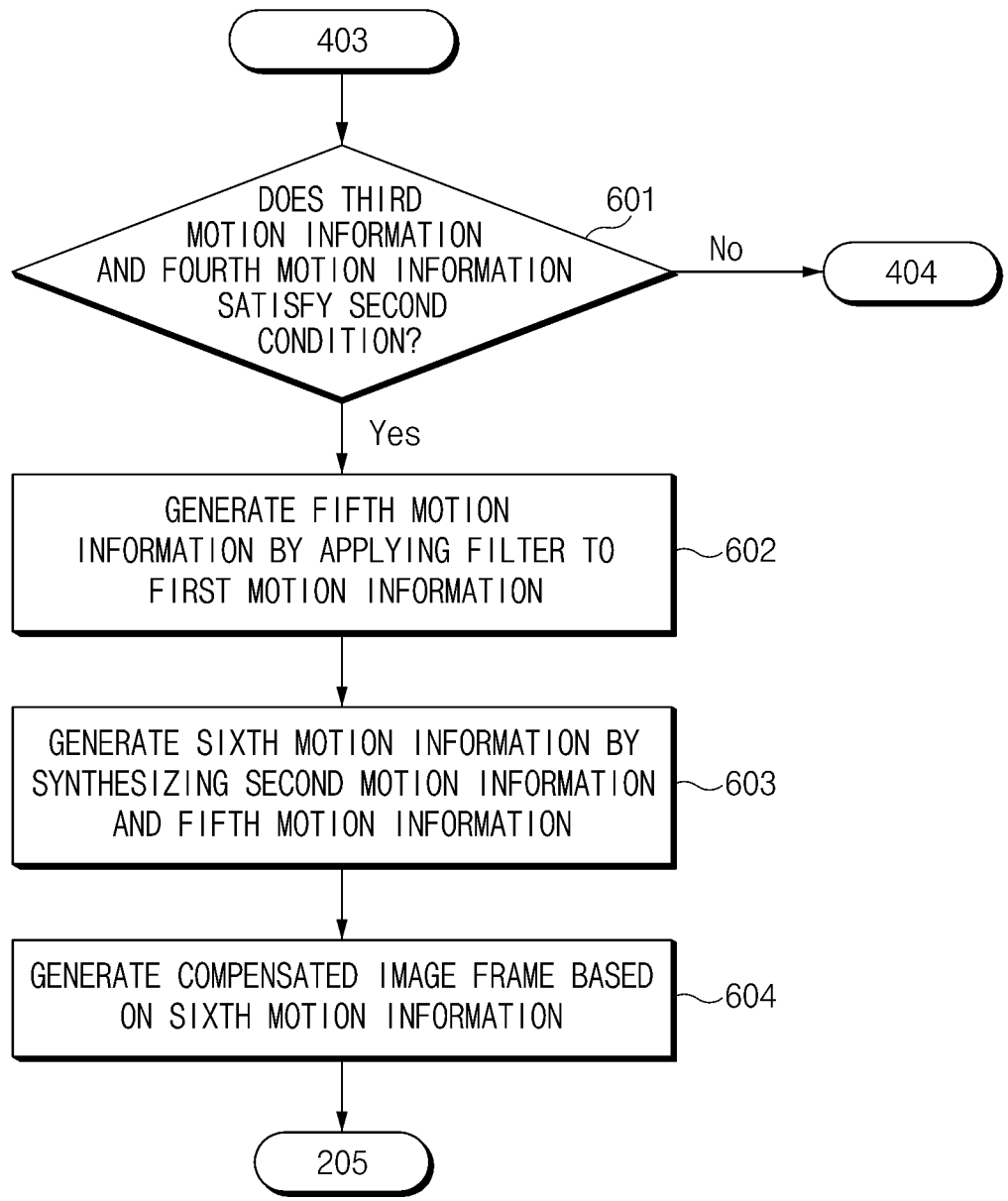
FIG. 6 is a flowchart illustrating a method of generating an image frame compensated further based on estimated motion information, according to an embodiment.

FIG. 6 is a flowchart illustrating a method of generating an image frame compensated further based on estimated motion information, according to an embodiment.

Referring to FIG. 6, when the third motion information and the fourth motion information do not satisfy a second condition in operation 601 after operation 403, the processor 140 may perform operation 404 of generating the image frame compensated based on the fourth motion information.

The second condition is a condition for determining whether an error occurs in image-based motion information. In an embodiment, the second condition may be defined as an event that the difference between the motion included in the third motion information and the motion included in the fourth motion information exceeds a second threshold value and a ratio of the motion included in the third motion information to the motion included in the fourth motion information is within a predefined range (e.g., (the motion value of the third motion information)/(the motion value of the fourth motion information)>a preset ratio).

When the third motion information and the fourth motion information satisfy the second condition in operation 601, the processor 140 may perform operation 602 of generating the fifth motion information by applying second LPF, which has a wider pass band than first LPF in operation 203, to the first motion information.

The fifth motion information is motion information estimated that motion compensation is applied to the image frame by the OIS unit 111. Because the OIS unit 111 removes the motion of a high-frequency domain, the processor 140 may generate the fifth motion information by applying LPF to the first motion information.

In an embodiment, the processor 140 may generate new fifth motion information including at least part of the first motion information and at least part of second motion information, based on a fifth weight corresponding to the first motion and a sixth weight corresponding to the fifth motion information. For example, the processor 140 may use an IIR filter as LPF. That is, a plurality of image frames may include a first image frame and a second image frame that is the previous image frame of the first image frame. The processor 140 may generate the fifth motion information corresponding to the first image frame, by synthesizing the first motion information, which corresponds to the first image frame and to which the fifth weight is applied, and the fifth motion information, which corresponds to the second image frame and to which the sixth weight is applied.

LPF implemented as the IIR filter may be expressed as following Equation 3.

Assumed_ImageMV(n)=(1−AssumeWeight)×GyroMV(n)+AssumeWeight×Assumed_ImageMV(n−1)  [Equation 3]

(In Equation 3, GyroMV is the first motion information; Assumed_ImageMV is the fifth motion information; (1−Assume Weight) is the fifth weight; Assume Weight is the sixth weight; the 'n' is the image frame number.)

In operation 603, the processor 140 may generate the sixth motion information by synthesizing the second motion information and the fifth motion information.

In an embodiment, the processor 140 may generate the sixth motion information by synthesizing the second motion information, to which a seventh weight is applied, and the fifth motion information, to which an eighth weight is applied. The sum of the seventh weight and the eighth weight may be '1'.

A method of generating the sixth motion information may be expressed as following Equation 4.

CompensationMV(n)=Weight×GyroMV$_{LPF}$(n)+(1−Weight)×Assumed_ImageMV(n)  [Equation 4]

(In Equation 4, GyroMV$_{LPF}$ is the second motion information; Assumed_ImageMV is the fifth motion information; CompensationMV is the sixth motion information; Weight is the seventh weight; (1−Weight) is the eighth weight; the 'n' is the image frame number.

Figure 7A:
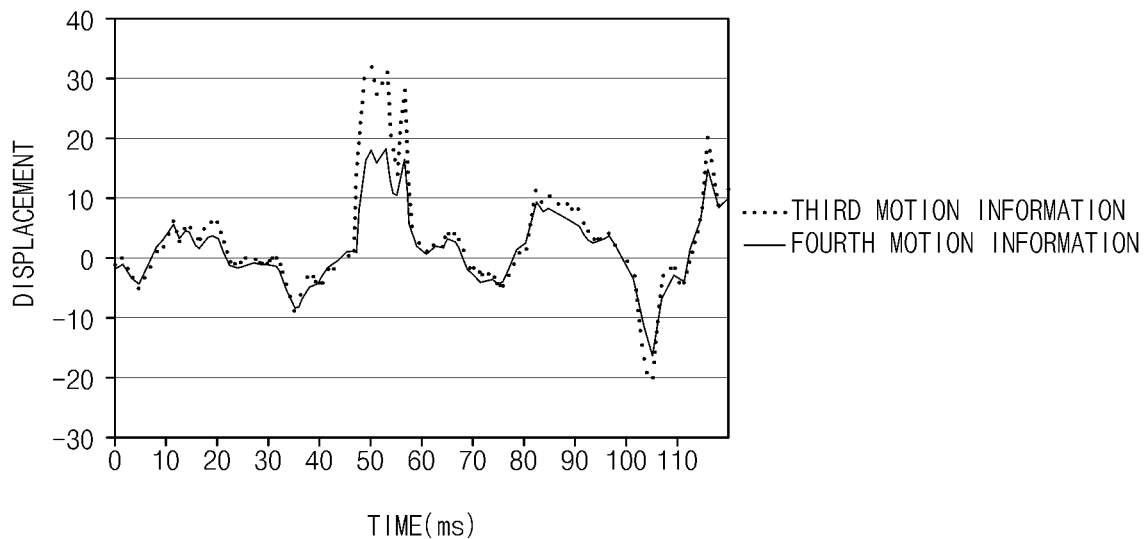
FIG. 7A is a graph illustrating third motion information and fourth motion information through displacement with time, according to an embodiment.
Figure 7B:
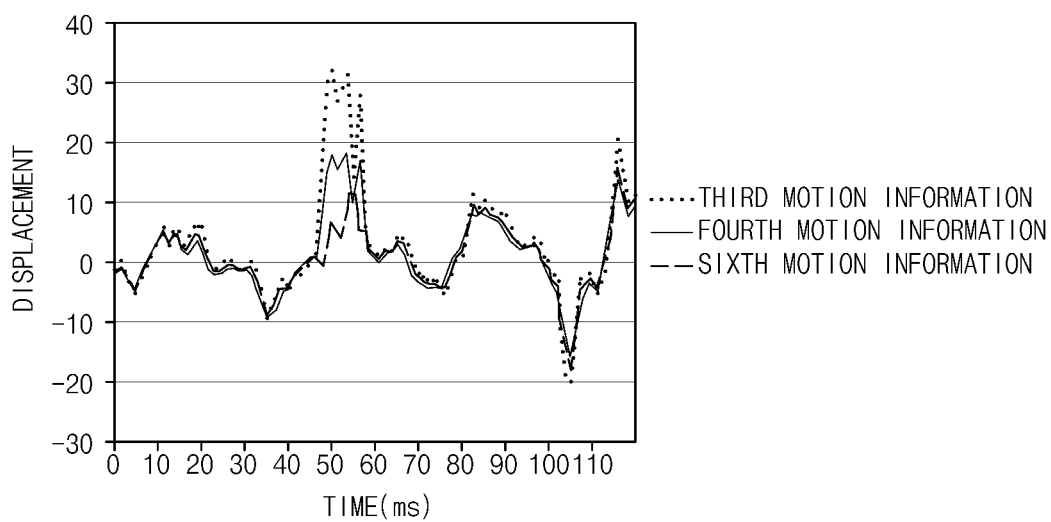
FIG. 7B is a graph illustrating third motion information, fourth motion information, and sixth motion information through displacement with time, according to an embodiment.

FIG. 7A is a graph illustrating third motion information and fourth motion information through displacement with time, according to an embodiment. FIG. 7B is a graph illustrating third motion information, fourth motion information, and sixth motion information through displacement with time, according to an embodiment.

In an embodiment, the first threshold value of the second condition may be '5', and the predefined range of the second condition (the motion value of the third motion information)/(the motion value of the fourth motion information) may exceed '1.3'.

Referring to FIG. 7A, the displacement difference between the third motion information and the fourth motion information excesses '5' at approximately 50 ms. Moreover, the displacement of the fourth motion information is less than '20', but the displacement of the third motion information exceeds '30'. When the second condition is satisfied, the processor 140 may generate the fifth motion information by applying second LPF to the first motion information and may generate the sixth motion information by synthesizing the second motion information and the fifth motion information.

Referring to FIG. 7B, the displacement of the sixth motion information is less than the displacement of the fourth motion information at approximately 50 ms.

In operation 604, the processor 140 may generate one or more image frames in each of which at least part of motions is compensated among motions based on the sixth motion information, from at least part of image frames. Operation 604 may be an operation corresponding to operation 204 described above and may generate the image frames compensated based on the sixth motion information.

The processor 140 may perform operation 205 of displaying the generated at least one compensated image frame, via the display 130 operatively connected to the electronic device 100.

Figure 8:
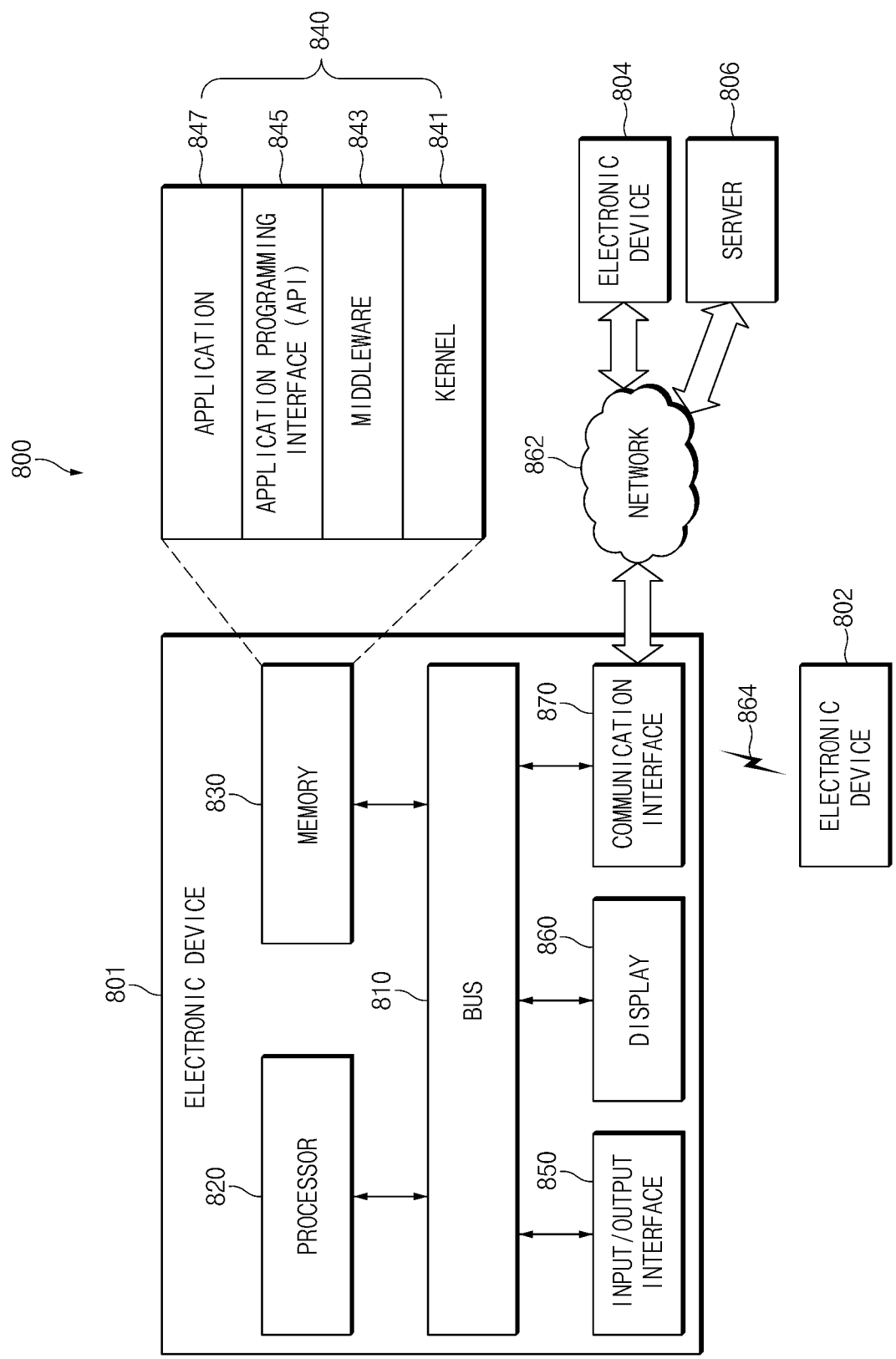
FIG. 8 illustrates an electronic device in a network environment, according to various embodiments.

FIG. 8 illustrates an electronic device in a network environment system, according to various embodiments.

Referring to FIG. 8, according to various embodiments, an electronic device 801, a first electronic device 802, a second electronic device 804, or a server 806 may be connected each other over a network 862 or a short range communication 864. The electronic device 801 may include a bus 810, a processor 820, a memory 830, an input/output interface 850, a display 860, and a communication interface 870. According to an embodiment, the electronic device 801 may not include at least one of the above-described components or may further include other component(s).

For example, the bus 810 may interconnect the above-described components 810 to 870 and may include a circuit for conveying communications (e.g., a control message and/or data) among the above-described components.

The processor 820 may include one or more of a central processing unit (CPU), an application processor (AP), or a communication processor (CP). For example, the processor 820 may perform an arithmetic operation or data processing associated with control and/or communication of at least other components of the electronic device 801.

The memory 830 may include a volatile and/or nonvolatile memory. For example, the memory 830 may store commands or data associated with at least one other component(s) of the electronic device 801. According to an embodiment, the memory 830 may store software and/or a program 840. The program 840 may include, for example, a kernel 841, a middleware 843, an application programming interface (API) 845, and/or an application program (or "an application") 847. At least a part of the kernel 841, the middleware 843, or the API 845 may be referred to as an "operating system (OS)".

For example, the kernel 841 may control or manage system resources (e.g., the bus 810, the processor 820, the memory 830, and the like) that are used to execute operations or functions of other programs (e.g., the middleware 843, the API 845, and the application program 847). Furthermore, the kernel 841 may provide an interface that allows the middleware 843, the API 845, or the application program 847 to access discrete components of the electronic device 801 so as to control or manage system resources.

The middleware 843 may perform, for example, a mediation role such that the API 845 or the application program 847 communicates with the kernel 841 to exchange data.

Furthermore, the middleware 843 may process task requests received from the application program 847 according to a priority. For example, the middleware 843 may assign the priority, which makes it possible to use a system resource (e.g., the bus 810, the processor 820, the memory 830, or the like) of the electronic device 801, to at least one of the application program 847. For example, the middleware 843 may process the one or more task requests according to the priority assigned to the at least one, which makes it possible to perform scheduling or load balancing on the one or more task requests.

The API 845 may be, for example, an interface through which the application program 847 controls a function provided by the kernel 841 or the middleware 843, and may include, for example, at least one interface or function (e.g., an instruction) for a file control, a window control, image processing, a character control, or the like.

The input/output interface 850 may play a role, for example, of an interface which transmits a command or data input from a user or another external device, to other component(s) of the electronic device 801. Furthermore, the input/output interface 850 may output a command or data, received from other component(s) of the electronic device 801, to a user or another external device.

The display 860 may include, for example, a liquid crystal display (LCD), a light-emitting diode (LED) display, an organic LED (OLED) display, a microelectromechanical systems (MEMS) display, or an electronic paper display. The display 860 may display, for example, various contents (e.g., a text, an image, a video, an icon, a symbol, and the like) to a user. The display 860 may include a touch screen and may receive, for example, a touch, gesture, proximity, or hovering input using an electronic pen or a part of a user's body.

For example, the communication interface 870 may establish communication between the electronic device 801 and an external device (e.g., the first electronic device 802, the second electronic device 804, or the server 806). For example, the communication interface 870 may be connected to the network 862 over wireless communication or wired communication to communicate with the external device (e.g., the second electronic device 804 or the server 806).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 864. The short range communication 864 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 801 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 862 may include at least one of telecommunications networks, for example, a computer network (e.g., LAN or WAN), an Internet, or a telephone network.

Each of the first and second electronic devices 802 and 804 may be a device of which the type is different from or the same as that of the electronic device 801. According to an embodiment, the server 806 may include a group of one or more servers. According to various embodiments, all or a portion of operations that the electronic device 801 will perform may be executed by another or plural electronic devices (e.g., the first electronic device 802, the second electronic device 804 or the server 806). According to an embodiment, in the case where the electronic device 801 executes any function or service automatically or in response to a request, the electronic device 801 may not perform the function or the service internally, but, alternatively additionally, it may request at least a portion of a function associated with the electronic device 801 from another device (e.g., the electronic device 802 or 804 or the server 806). The other electronic device may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used.

Figure 9:
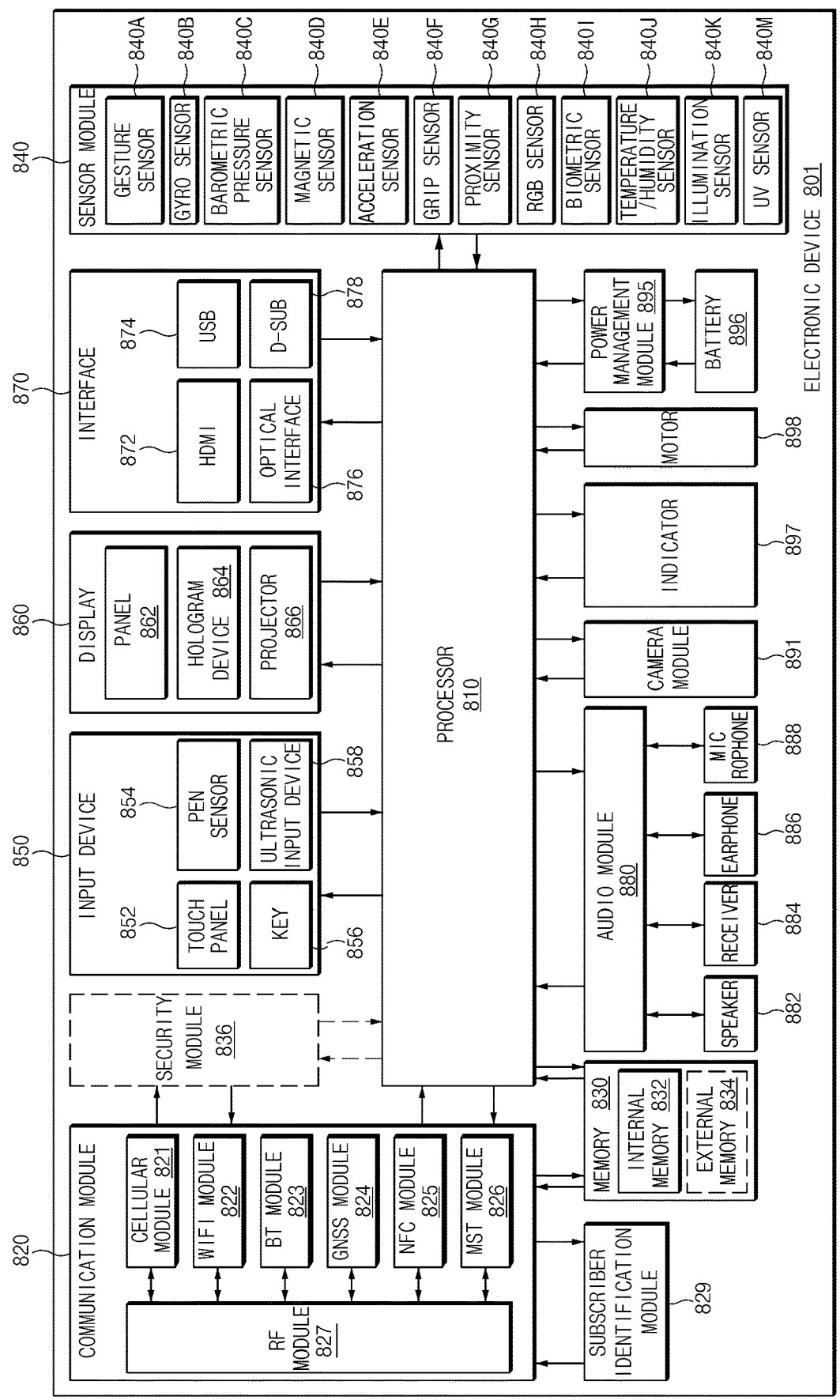
FIG. 9 illustrates a block diagram of the electronic device, according to various embodiments.

FIG. 9 illustrates a block diagram of an electronic device, according to various embodiments.

Referring to FIG. 9, an electronic device 901 may include, for example, all or a part of the electronic device 801 illustrated in FIG. 8. The electronic device 901 may include one or more processors (e.g., an application processor (AP)) 910, a communication module 920, a subscriber identification module 924, a memory 930, a sensor module 940, an input device 950, a display 960, an interface 970, an audio module 980, a camera module 991, a power management module 995, a battery 996, an indicator 997, and a motor 998.

The processor 910 may drive, for example, an operating system (OS) or an application to control a plurality of hardware or software components connected to the processor 910 and may process and compute a variety of data. For example, the processor 910 may be implemented with a System on Chip (SoC). According to an embodiment, the processor 910 may further include a graphic processing unit (GPU) and/or an image signal processor. The processor 910 may include at least a part (e.g., a cellular module 921) of components illustrated in FIG. 9. The processor 910 may load a command or data, which is received from at least one of other components (e.g., a nonvolatile memory), into a volatile memory and process the loaded command or data. The processor 910 may store a variety of data in the nonvolatile memory.

The communication module 920 may be configured the same as or similar to the communication interface 870 of FIG. 8. The communication module 920 may include the cellular module 921, a Wi-Fi module 922, a Bluetooth (BT) module 923, a GNSS module 924 (e.g., a GPS module, a Glonass module, a Beidou module, or a Galileo module), a near field communication (NFC) module 925, a MST module 926 and a radio frequency (RF) module 927.

The cellular module 921 may provide, for example, voice communication, video communication, a character service, an Internet service, or the like over a communication network. According to an embodiment, the cellular module 921 may perform discrimination and authentication of the electronic device 901 within a communication network by using the subscriber identification module (e.g., a SIM card) 929. According to an embodiment, the cellular module 921 may perform at least a portion of functions that the processor 910 provides. According to an embodiment, the cellular module 921 may include a communication processor (CP).

Each of the Wi-Fi module 922, the BT module 923, the GNSS module 924, the NFC module 925, or the MST module 926 may include a processor for processing data exchanged through a corresponding module, for example. According to an embodiment, at least a part (e.g., two or more) of the cellular module 921, the Wi-Fi module 922, the BT module 923, the GNSS module 924, the NFC module 925, or the MST module 926 may be included within one Integrated Circuit (IC) or an IC package.

For example, the RF module 927 may transmit and receive a communication signal (e.g., an RF signal). For example, the RF module 927 may include a transceiver, a power amplifier module (PAM), a frequency filter, a low noise amplifier (LNA), an antenna, or the like. According to another embodiment, at least one of the cellular module 921, the Wi-Fi module 922, the BT module 923, the GNSS module 924, the NFC module 925, or the MST module 926 may transmit and receive an RF signal through a separate RF module.

The subscriber identification module 929 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 930 (e.g., the memory 830) may include an internal memory 932 or an external memory 934. For example, the internal memory 932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 934 may be operatively and/or physically connected to the electronic device 901 through various interfaces.

A security module 936 may be a module that includes a storage space of which a security level is higher than that of the memory 930 and may be a circuit that guarantees safe data storage and a protected execution environment. The security module 936 may be implemented with a separate circuit and may include a separate processor. For example, the security module 936 may be in a smart chip or a secure digital (SD) card, which is removable, or may include an embedded secure element (eSE) embedded in a fixed chip of the electronic device 901. Furthermore, the security module 936 may operate based on an operating system (OS) that is different from the OS of the electronic device 901. For example, the security module 936 may operate based on java card open platform (JCOP) OS.

The sensor module 940 may measure, for example, a physical quantity or may detect an operation state of the electronic device 901. The sensor module 940 may convert the measured or detected information to an electric signal. For example, the sensor module 940 may include at least one of a gesture sensor 940A, a gyro sensor 940B, a barometric pressure sensor 940C, a magnetic sensor 940D, an acceleration sensor 940E, a grip sensor 940F, the proximity sensor 940G, a color sensor 940H (e.g., red, green, blue (RGB) sensor), a biometric sensor 940I, a temperature/humidity sensor 940J, an illuminance sensor 940K, or an UV sensor 940M. Although not illustrated, additionally or alternatively, the sensor module 940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling at least one or more sensors included therein. According to an embodiment, the electronic device 901 may further include a processor that is a part of the processor 910 or independent of the processor 910 and is configured to control the sensor module 940. The processor may control the sensor module 940 while the processor 910 remains at a sleep state.

The input device 950 may include, for example, a touch panel 952, a (digital) pen sensor 954, a key 956, or an ultrasonic input unit 958. For example, the touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, a keypad, or the like. The ultrasonic input device 958 may detect (or sense) an ultrasonic signal, which is generated from an input device, through a microphone (e.g., a microphone 988) and may check data corresponding to the detected ultrasonic signal.

The display 960 (e.g., the display 860) may include a panel 962, a hologram device 964, or a projector 966. The panel 962 may be the same as or similar to the display 860 illustrated in FIG. 8. The panel 962 may be implemented, for example, to be flexible, transparent or wearable. The panel 962 and the touch panel 952 may be integrated into a single module. The hologram device 964 may display a stereoscopic image in a space using a light interference phenomenon. The projector 966 may project light onto a screen so as to display an image. For example, the screen may be arranged in the inside or the outside of the electronic device 901. According to an embodiment, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-sub-miniature (D-sub) 978. The interface 970 may be included, for example, in the communication interface 870 illustrated in FIG. 8. Additionally or alternatively, the interface 970 may include, for example, a mobile high definition link (MHL) interface, a SD card/multi-media card (MMC) interface, or an infrared data association (IrDA) standard interface.

The audio module 980 may convert a sound and an electric signal in dual directions. At least a component of the audio module 980 may be included, for example, in the input/output interface 850 illustrated in FIG. 8. The audio module 980 may process, for example, sound information that is input or output through a speaker 982, a receiver 984, an earphone 986, or the microphone 988.

For example, the camera module 991 may shoot a still image or a video. According to an embodiment, the camera module 991 may include at least one or more image sensors (e.g., a front sensor or a rear sensor), a lens, an image signal processor (ISP), or a flash (e.g., an LED or a xenon lamp).

The power management module 995 may manage, for example, power of the electronic device 901. According to an embodiment, a power management integrated circuit (PMIC), a charger IC, or a battery or fuel gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 996 and a voltage, current or temperature thereof while the battery is charged. The battery 996 may include, for example, a rechargeable battery and/or a solar battery.

The indicator 997 may display a specific state of the electronic device 901 or a part thereof (e.g., the processor 910), such as a booting state, a message state, a charging state, and the like. The motor 998 may convert an electrical signal into a mechanical vibration and may generate the following effects: vibration, haptic, and the like. Although not illustrated, a processing device (e.g., a GPU) for supporting a mobile TV may be included in the electronic device 901. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 10:
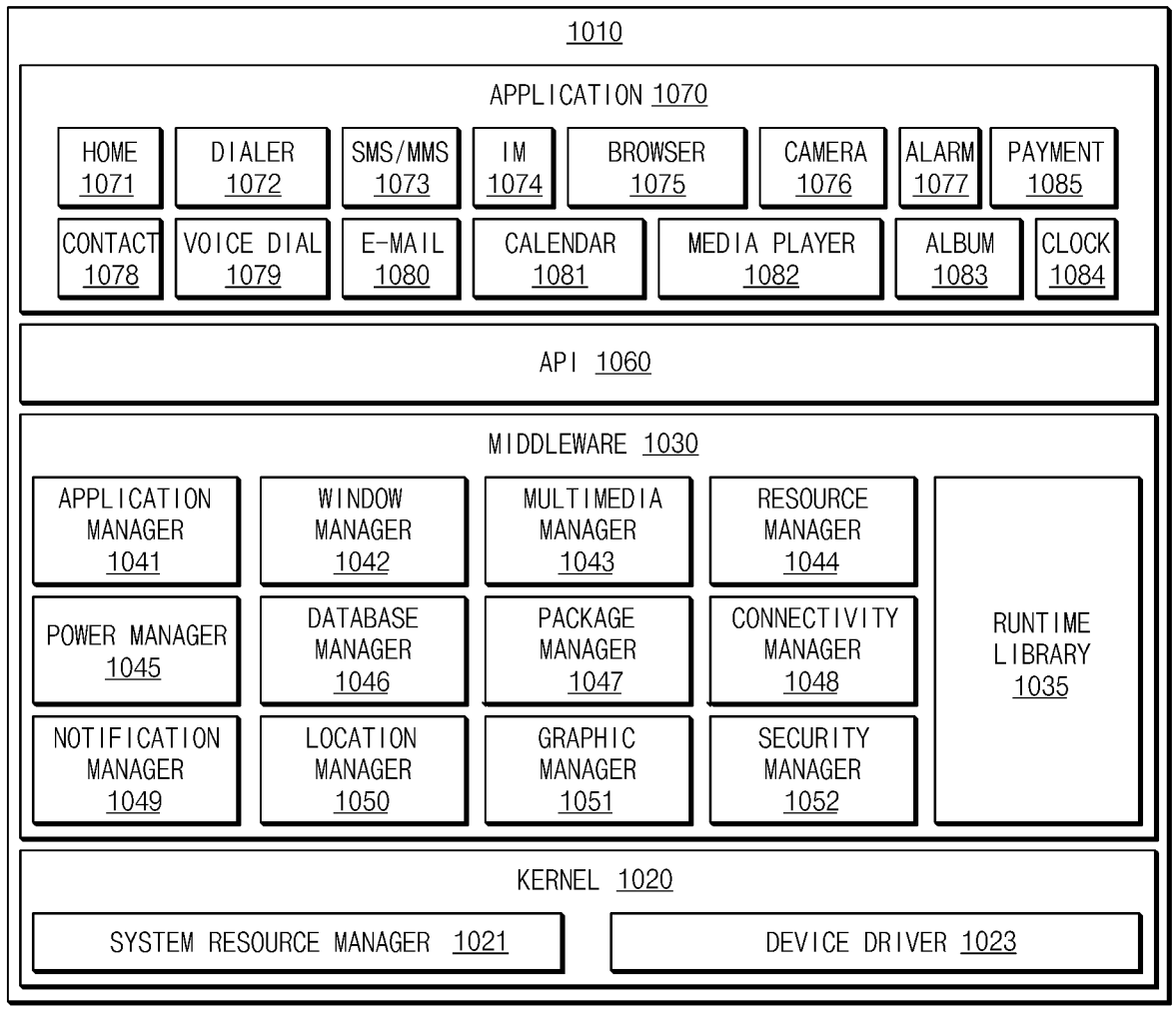
FIG. 10 illustrates a block diagram of a program module, according to various embodiments.

FIG. 10 illustrates a block diagram of a program module, according to various embodiments.

According to an embodiment, a program module 1010 (e.g., the program 840) may include an operating system (OS) to control resources associated with an electronic device (e.g., the electronic device 801), and/or diverse applications (e.g., the application program 847) driven on the OS. The OS may be, for example, Android™, iOS™, Windows™, Symbian™, or Tizen™.

The program module 1010 may include a kernel 1020, a middleware 1030, an application programming interface (API) 1060, and/or an application 1070. At least a portion of the program module 1010 may be preloaded on an electronic device or may be downloadable from an external electronic device (e.g., the first electronic device 802, the second electronic device 804, the server 806, or the like).

The kernel 1020 (e.g., the kernel 841) may include, for example, a system resource manager 1021 or a device driver 1023. The system resource manager 1021 may perform control, allocation, or retrieval of system resources. According to an embodiment, the system resource manager 1021 may include a process managing unit, a memory managing unit, or a file system managing unit. The device driver 1023 may include, for example, a display driver, a camera driver, a Bluetooth driver, a shared memory driver, a USB driver, a keypad driver, a Wi-Fi driver, an audio driver, or an inter-process communication (IPC) driver.

The middleware 1030 may provide, for example, a function that the application 1070 needs in common, or may provide diverse functions to the application 1070 through the API 1060 to allow the application 1070 to efficiently use limited system resources of the electronic device. According to an embodiment, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, or a payment manager 1054.

The runtime library 1035 may include, for example, a library module that is used by a compiler to add a new function through a programming language while the application 1070 is being executed. The runtime library 1035 may perform input/output management, memory management, or capacities about arithmetic functions.

The application manager 1041 may manage, for example, a life cycle of at least one application of the application 1070. The window manager 1042 may manage a graphic user interface (GUI) resource that is used in a screen. The multimedia manager 1043 may identify a format necessary for playing diverse media files, and may perform encoding or decoding of media files by using a codec suitable for the format. The resource manager 1044 may manage resources such as a storage space, memory, or source code of at least one application of the application 1070.

The power manager 1045 may operate, for example, with a basic input/output system (BIOS) to manage a battery or power, and may provide power information for an operation of an electronic device. The database manager 1046 may generate, search for, or modify database that is to be used in at least one application of the application 1070. The package manager 1047 may install or update an application that is distributed in the form of package file.

The connectivity manager 1048 may manage, for example, wireless connection such as Wi-Fi or Bluetooth. The notification manager 1049 may display or notify an event such as arrival message, appointment, or proximity notification in a mode that does not disturb a user. The location manager 1050 may manage location information about an electronic device. The graphic manager 1051 may manage a graphic effect that is provided to a user, or manage a user interface relevant thereto. The security manager 1052 may provide a general security function necessary for system security, user authentication, or the like. According to an embodiment, in the case where an electronic device (e.g., the electronic device 801) includes a telephony function, the middleware 1030 may further include a telephony manager for managing a voice or video call function of the electronic device.

The middleware 1030 may include a middleware module that combines diverse functions of the above-described components. The middleware 1030 may provide a module specialized to each OS kind to provide differentiated functions. Additionally, the middleware 1030 may dynamically remove a part of the preexisting components or may add new components thereto.

The API 1060 (e.g., the API 845) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1070 (e.g., the application program 847) may include, for example, one or more applications capable of providing functions for a home 1071, a dialer 1072, an SMS/MMS 1073, an instant message (IM) 1074, a browser 1075, a camera 1076, an alarm 1077, a contact 1078, a voice dial 1079, an e-mail 1080, a calendar 1081, a media player 1082, an album 1083, or a timepiece 1084 or for offering health care (e.g., measuring an exercise quantity, blood sugar, or the like) or environment information (e.g., information of barometric pressure, humidity, temperature, or the like).

According to an embodiment, the application 1070 may include an application (hereinafter referred to as "information exchanging application" for descriptive convenience) to support information exchange between an electronic device (e.g., the electronic device 801) and an external electronic device (e.g., the first electronic device 802 or the second electronic device 804). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1070 may include an application (e.g., a health care application of a mobile medical device) that is assigned in accordance with an attribute of an external electronic device. According to an embodiment, the application 1070 may include an application that is received from an external electronic device (e.g., the first electronic device 802, the second electronic device 804, or the server 806). According to an embodiment, the application 1070 may include a preloaded application or a third party application that is downloadable from a server. The names of components of the program module 1010 according to the embodiment may be modifiable depending on kinds of operating systems.

According to various embodiments, at least a portion of the program module 1010 may be implemented by software, firmware, hardware, or a combination of two or more thereof. At least a portion of the program module 1010 may be implemented (e.g., executed), for example, by the processor (e.g., the processor 910). At least a portion of the program module 1010 may include, for example, modules, programs, routines, sets of instructions, processes, or the like for performing one or more functions.

According to an embodiment disclosed in the disclosure, an electronic device may include a camera, a sensor obtaining first motion information about motion of the electronic device, and a processor electrically connected to the camera and the sensor. The processor may be configured to receive a plurality of image frames from the camera, to generate second motion information by applying a filter for a specified frequency band to the first motion information, to generate one or more image frames, in each of which at least partial motion of the motion is compensated based on the second motion information, from the at least part of image frames, and to display the one or more image frames through a display operatively connected to the electronic device. The receiving may include obtaining the first motion information about at least part of image frames among the plurality of image frames.

In an embodiment, the camera may further include an optical image stabilization (OIS) unit, and the processor may be configured to obtain the plurality of image frames in each of which at least other partial motion of the motion is compensated by the OIS unit, using the camera as at least part of the receiving.

In an embodiment, the processor may be configured to generate motion information including at least part of the first motion information and at least part of the second motion information, based on a first weight corresponding to the first motion information and a second weight corresponding to the second motion information and to generate one or more image frames in each of which the at least partial motion of the motion is compensated further based at least on the generated motion information, from the at least part of image frames.

In an embodiment, the processor may be configured to generate third motion information based on motion of at least one object included in the plurality of image frames and to generate one or more image frames in each of which the at least partial motion of the motion is compensated further based at least on the generated third motion information, from the at least part of image frames.

In an embodiment, the first condition may be that a difference between motion included in the second motion information and motion included in the third motion information exceeds a first threshold value.

In an embodiment, the generating of the one or more image frames in each of which the at least partial motion of the motion is compensated further based at least on the generated third motion information, from the at least part of image frames may include generating fourth motion information by synthesizing the second motion information and the third motion information and generating one or more image frames in each of which the at least partial motion of the motion is compensated further based at least on the generated fourth motion information, from the at least part of image frames.

In an embodiment, the processor may be configured to generate fifth motion information by applying second LPF having a wider pass band than the first LPF to the first motion information, based on a fact that the third motion information and the fourth motion information satisfy a second condition, to generate sixth motion information by synthesizing the second motion information and the generated fifth motion information, and to generate one or more image frames in each of which the at least partial motion of the motion is compensated further based at least on the generated sixth motion information, from the at least part of image frames.

In an embodiment, the second condition may be that a difference between motion included in the third motion information and motion included in the fourth motion information exceeds a second threshold value and a ratio of the motion included in the third motion information to the motion included in the fourth motion information corresponds to a predefined range.

In an embodiment, the sensor may be mounted in the camera.

Furthermore, according to an embodiment disclosed in the disclosure, a recording medium storing computer-readable instructions may, when executed by a processor of an electronic device, cause the electronic device to perform receiving a plurality of image frames, wherein the receiving includes obtaining the first motion information associated with motion of the electronic device for at least part of image frames among the plurality of image frames, generating second motion information by applying a filter for a specified frequency band to the first motion information, generating one or more image frames, in each of which at least partial motion of the motion is compensated based on the second motion information, from the at least part of image frames, and displaying the one or more image frames through a display operatively connected to the electronic device.

In an embodiment, the instructions may, when executed by the processor of the electronic device, cause the electronic device to further perform obtaining the plurality of image frames in each of which at least other partial motion of the motion is compensated by an OIS unit, as at least part of the receiving.

In an embodiment, the instructions may, when executed by the processor of the electronic device, cause the electronic device to further perform generating motion information including at least part of the first motion information and at least part of the second motion information, based on a first weight corresponding to the first motion information and a second weight corresponding to the second motion information, and the generating of the one or more image frames, in each of which the at least partial motion is compensated may include generating one or more image frames in each of which the at least partial motion of the motion is compensated further based at least on the generated motion information, from the at least part of image frames.

In an embodiment, the instructions may, when executed by the processor of the electronic device, cause the electronic device to further perform generating third motion information based on motion of at least one object included in the plurality of image frames, and the generating of the one or more image frames, in each of which the at least partial motion is compensated may include generating one or more image frames in each of which the at least partial motion of the motion is compensated further based at least on the generated third motion information, from the at least part of image frames.

In an embodiment, the first condition may be that a difference between motion included in the second motion information and motion included in the third motion information exceeds a first threshold value.

In an embodiment, the generating of the one or more image frames in each of which the at least partial motion of the motion is compensated further based at least on the generated third motion information, from the at least part of image frames may include generating fourth motion information by synthesizing the second motion information and the third motion information and generating one or more image frames in each of which the at least partial motion of the motion is compensated further based at least on the generated fourth motion information, from the at least part of image frames.

In an embodiment, the instructions may, when executed by a processor of an electronic device, cause the electronic device to further perform generating fifth motion information by applying second LPF having a wider pass band than the first LPF to the first motion information, based on a fact that the third motion information and the fourth motion information satisfy a second condition and generating sixth motion information by synthesizing the second motion information and the generated fifth motion information. The generating of the one or more image frames, in each of which the at least partial motion is compensated may include generating one or more image frames in each of which the at least partial motion of the motion is compensated further based at least on the generated sixth motion information, from the at least part of image frames.

In an embodiment, the second condition may be that a difference between motion included in the third motion information and motion included in the fourth motion information exceeds a second threshold value and a ratio of the motion included in the third motion information to the motion included in the fourth motion information corresponds to a predefined range.

Furthermore, according to an embodiment disclosed in the disclosure, an electronic device may include a camera including an optical image stabilization (OIS) function and obtaining a plurality of image frames compensated based on the OIS function, a display, a motion sensor obtaining motion information of the electronic device while the plurality of image frames are obtained, and a processor electrically connected to the camera, the display, and the sensor. The processor may be configured to generate a first motion vector based on the obtained motion information, to generate a second motion vector by applying first LPF to the first motion vector, to generate at least one compensated image frame from the plurality of image frames based on the second motion vector, and to display the generated at least one compensated image frame via the display.

In an embodiment, the processor may be configured to generate a third motion vector based on at least one object included in the plurality of image frames, to generate a fourth motion vector by synthesizing the second motion vector and the third motion vector when a difference between the second motion vector and the generated third motion vector exceeds a first threshold value, and to generate at least one compensated image frame from the plurality of image frames based on the fourth motion vector.

In an embodiment, when the difference between the third motion vector and the fourth motion vector exceeds a second threshold value and a ratio of the third motion vector to the fourth motion vector is within a predefined range, the processor may be configured to generate a fifth motion vector by applying second LPF having a wider pass band than the first LPF to the first motion information, to generate a sixth motion vector by synthesizing the second motion vector and the generated fifth motion vector, and to generate at least one compensated image frame from the plurality of image frames based on the generated sixth motion vector.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 820), may cause the one or more processors to perform a function corresponding to the instruction. The computer-readable storage media, for example, may be the memory 830.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a sensor configured to obtain first motion information about motion of the electronic device; and
   a processor electrically connected to the camera and the sensor, wherein the processor is configured to:
      receive a plurality of image frames from the camera, wherein the receiving includes obtaining the first motion information about at least part of image frames among the plurality of image frames;
      generate second motion information by applying a first filter for a specified frequency band to the first motion information;
      generate third motion information based on motion of at least one object included in the plurality of image frames;
      based on a determination that a first condition is satisfied, generate one or more image frames, in each of which at least partial motion of the motion is compensated based on the second motion information and the third motion information, from the at least part of image frames, wherein the first condition is that a difference between motion included in the second motion information and motion included in the third motion information exceeds a first threshold value; and
      display the one or more image frames through a display operatively connected to the electronic device.

2. The electronic device of claim 1, wherein the camera further includes an optical image stabilization (OIS) unit, and
   wherein the processor is configured to:
      obtain the plurality of image frames in each of which at least other partial motion of the motion is compensated by the OIS unit, using the camera as at least part of the receiving.

3. The electronic device of claim 1, wherein the processor is configured to:
   generate motion information including at least part of the first motion information and at least part of the second motion information, based on a first weight corresponding to the first motion information and a second weight corresponding to the second motion information; and
   generate one or more image frames in each of which the at least partial motion of the motion is compensated further based at least on the generated motion information, from the at least part of image frames.

4. The electronic device of claim 1, wherein the generating of the one or more image frames in each of which the at least partial motion of the motion is compensated based on the second motion information and the third motion information, from the at least part of image frames includes:
   generating fourth motion information by synthesizing the second motion information and the third motion information; and
   generating one or more image frames in each of which the at least partial motion of the motion is compensated further based at least on the generated fourth motion information, from the at least part of image frames.

5. The electronic device of claim 4, wherein the processor is configured to:
   generate fifth motion information by applying a second filter having a wider pass band than the first filter to the first motion information, based on the third motion information and the fourth motion information satisfying a second condition;
   generate sixth motion information by synthesizing the second motion information and the generated fifth motion information; and generate one or more image frames in each of which the at least partial motion of the motion is compensated further based at least on the generated sixth motion information, from the at least part of image frames.

6. The electronic device of claim 5, wherein the second condition is that a difference between motion included in the third motion information and motion included in the fourth motion information exceeds a second threshold value and a ratio of the motion included in the third motion information to the motion included in the fourth motion information corresponds to a predefined range.

7. A non-volatile recording medium storing computer-readable instructions, the instructions, when executed by a processor of an electronic device, causing the electronic device to perform:
- receiving a plurality of image frames, wherein the receiving includes obtaining first motion information associated with motion of the electronic device for at least part of image frames among the plurality of image frames;
- generating second motion information by applying a first filter for a specified frequency band to the first motion information;
- generating third motion information based on motion of at least one object included in the plurality of image frames;
- based on a determination that a first condition is satisfied, generating one or more image frames, in each of which at least partial motion of the motion is compensated based on the second motion information and the third motion information, from the at least part of image frames, wherein the first condition is that a difference between motion included in the second motion information and motion included in the third motion information exceeds a first threshold value; and
- displaying the one or more image frames through a display operatively connected to the electronic device.

8. The non-volatile recording medium of claim 7, wherein obtaining the plurality of image frames in each of which at least other partial motion of the motion is compensated by an OIS unit, as at least part of the receiving.

9. The non-volatile recording medium of claim 7, wherein the instructions, when executed by the processor of the electronic device, causing the electronic device to further perform:
- generating motion information including at least part of the first motion information and at least part of the second motion information, based on a first weight corresponding to the first motion information and a second weight corresponding to the second motion information, and
- wherein the generating of the one or more image frames, in each of which the at least partial motion is compensated includes:
- generating one or more image frames in each of which the at least partial motion of the motion is compensated further based at least on the generated motion information, from the at least part of image frames.

10. The non-volatile recording medium of claim 7, wherein the generating of the one or more image frames in each of which the at least partial motion of the motion is compensated based on the second motion information and third motion information, from the at least part of image frames includes:
- generating fourth motion information by synthesizing the second motion information and the third motion information; and
- generating one or more image frames in each of which the at least partial motion of the motion is compensated further based at least on the generated fourth motion information, from the at least part of image frames.

11. The non-volatile recording medium of claim 10, wherein the instructions, when executed by a processor of an electronic device, causing the electronic device to further perform:
- generating fifth motion information by applying a second filter having a wider pass band than the first filter to the first motion information, based on a fact that the third motion information and the fourth motion information satisfy a second condition; and
- generating sixth motion information by synthesizing the second motion information and the generated fifth motion information, and
- wherein the generating of the one or more image frames, in each of which the at least partial motion is compensated includes:
- generating one or more image frames in each of which the at least partial motion of the motion is compensated further based at least on the generated sixth motion information, from the at least part of image frames.

* * * * *